(12) United States Patent
Azuma

(10) Patent No.: US 7,225,138 B2
(45) Date of Patent: May 29, 2007

(54) BUSINESS INFORMATION SYSTEM AND METHOD OF MANAGING BUSINESS INFORMATION

(75) Inventor: Tomihiko Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 1105 days.

(21) Appl. No.: 10/003,381

(22) Filed: Dec. 6, 2001

(65) Prior Publication Data

US 2002/0072929 A1    Jun. 13, 2002

(30) Foreign Application Priority Data

Dec. 13, 2000    (JP)    ............................ 2000-379032

(51) Int. Cl.
*G06Q 99/00* (2006.01)
(52) U.S. Cl. ........................................................ 705/1
(58) Field of Classification Search .................... 705/1; 707/9, 100
See application file for complete search history.

(56) References Cited

U.S. PATENT DOCUMENTS

| | | | | |
|---|---|---|---|---|
| 5,467,440 A | * | 11/1995 | Nihei | 345/440 |
| 6,067,548 A | * | 5/2000 | Cheng | 707/103 R |
| 6,366,913 B1 | * | 4/2002 | Fitler et al. | 707/9 |
| 6,529,911 B1 | * | 3/2003 | Mielenhausen | 707/100 |
| 6,668,255 B2 | * | 12/2003 | Mielenhausen | 707/100 |
| 6,725,224 B1 | * | 4/2004 | McCarthy et al. | 707/101 |
| 6,874,008 B1 | * | 3/2005 | Eason et al. | 709/201 |
| 6,957,229 B1 | * | 10/2005 | Dyor | 707/103 X |
| 6,986,138 B1 | * | 1/2006 | Sakaguchi et al. | 718/105 |
| 2005/0187927 A1 | * | 8/2005 | Morinville | 707/3 |

\* cited by examiner

*Primary Examiner*—Jonathan Ouellette
(74) *Attorney, Agent, or Firm*—Foley & Lardner LLP

(57) ABSTRACT

Provision of an organization definition information storing unit for storing organization definition information, a contents storing unit for storing contents provided for users, a customizing information storing unit for storing in set, as customizing information, a customizing condition set by the use of arbitrary organization definition information, and information for indicating contents to be provided as utilization environment in a case where the customizing condition is established, and a personal environment constructing means for acquiring the customizing information from the customizing information storing unit, for judging whether or not the customizing condition is established with regard to each user by utilizing the organization definition information stored in the organization definition information storing unit, and for acquiring the contents stored in set together with the customizing condition from the contents storing unit in a case where the customizing condition is established, thereby adding the acquired contents to the personal environment of the user.

14 Claims, 19 Drawing Sheets

FIG. 2

| division | item | content |
|---|---|---|
| entire information | hierarchy of organization | upper and lower relationship in a partial organization |
| | partial organization | name of organization, business territory, functional region, responsibility, powers, and heads |
| | distribution of personnel | affiliation, management span, and proper/additional occupational positions |
| | employee ID | numbers and codes for definitely and individually identifying individuals |
| information concerning individuals | names | name of individual |
| | occupational positions | a director, a division manager, a manager, a chief, and a worker |
| | category of occupation | a business, a development, and a customer support |
| | covering job | products, customers, areas, and processes |
| | functions | consulting, order management, sales plan, and comprehending of accomplishment |
| | duty | periodic reporting, meeting of exception, and secret-holding regulation |
| | knowledge | titles, techniques, a special field, and a language ability |
| | experiences | projects, customers, techniques, and areas |
| | locations | address, telephone number, FAX, and E-mail |

| attribute | value |
| --- | --- |
| employee ID | XO5 |
| names | Tomihiko Azuma |
| occupational positions | worker |
| category of occupation | business |
| covering job | video |
| password | xxxxxxx |

FIG. 5

```xml
<? xml version =" 1.0" ?>
<company> <name> AB Company Ltd </name>
<person> <employee ID> X 01 </employee ID>
<occupational position> president </occupational position>
</person>
<division> <name> division A </name>
<person> <employee ID> X 02 </employee ID>
<occupational position> manager </occupational position>
</person>
<department> <name> department A1 </name>
<person> <employee ID> X 04 </employee ID>
<occupational position> chief </occupational position>
</person>
<person> <employee ID> X 05 </employee ID>
<name> Tomihiko Azuma </name>
<occupational position> worker </occupational position>
<category of occupation> business </category of occupation>
<covering job> video </covering job>
<password> XXXXXXX </password>
</person>
<person>... </person>...
</department>
<department> <name> department A2 </name>...
<person>... </person>...
</department>
</division>
<division> <name> division B </name>
<person> <employee ID > X 03 </employee ID>
<occupational position> manager </occupational position>
<person>
<department> <name> department B1 </name>
<person> <employee ID> X 10 </employee ID>
<occupational position> chief </occupational position>
</person>
<person>...</person>...
</department>
<department> <name> department B2 </name>...
<person>...</person>...
</department>
</division>
</company>
```

FIG. 6

| tag | meaning | start | end |
|---|---|---|---|
| company | definition of company | <company> | </company> |
| division | definition of division | <division> | </division> |
| department | definition of department | <department> | </department> |
| name | definition of name of organization | <name> | </name> |
| person | definition of individual | <person> | </person> |
| employee ID | definition of employee ID of individual | <employee ID> | </employee ID> |
| name | definition of name of individual | <name> | </name> |
| occupational position | definition of occupational position of individual | <occupational position> | </occupational position> |
| category of occupation | definition of category of occupation of individual | <category of occupation> | </category of occupation> |
| covering job | definition on covering job of individual | <work> | </work> |
| password | definition of password of individual | <password> | </password> |

FIG. 7

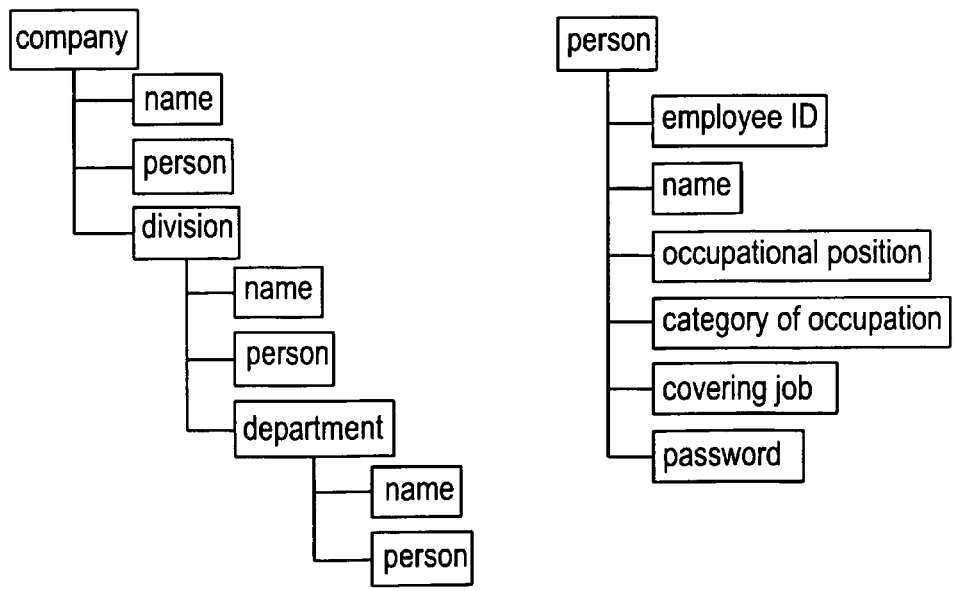

FIG. 9

```
dn: o = AB Company Ltd
objectclass: organization
o: AB Company Ltd dn: uid = XO1, o = AB Company Ltd
objectclass: inetOrgPerson
uid: XO1
title: president
...

dn: ou = division A, o = AB Company Ltd
obj ectclass: organizationalunit
ou: division A dn: uid = XO2, ou = division A, o = AB Company Ltd
objectclass: inetOrgPerson
uid: XO2
title: manager
...

dn: ou = department A1, ou = division A, o = AB Company Ltd
objectclass: organizationalunit
ou: department A1 dn: uid = XO4, ou = department A1, ou = division A, o = AB Company Ltd
objectclass: inetOrgPerson
uid: XO4
title: chief
...

dn: uid = XO5, ou = department A1, ou = division A, o = AB Company Ltd
objectclass: inetOrgPerson
uid: XO5
cn: Tomihiko Azuma
title: worker
category: business
product: video
userpassword: xxxxxxx dn: uid = XO6, ou = department A1, ou = division A, o = AB Company Ltd
...

dn ou = department A2, ou = division A, o = AB Company Ltd
...

dn: ou = division B, o = AB Company Ltd
...
```

FIG. 10

| attributes | meaning |
|---|---|
| dn | identification data of object |
| objectclass | class of object |
| o | name of Company |
| ou | name of organization |
| uid | employee ID of individual |
| cn | name of individual |
| title | occupational position of individual |
| category | category of occupation of individual |
| product | covering job of individual |
| userpassword | password of individual |

FIG. 11A

| organization | upper organization |
|---|---|
| AB Company Ltd | |
| division A | AB Company Ltd |
| division B | AB Company Ltd |
| department A1 | division A |
| department A2 | division A |
| department B1 | division B |
| department B2 | division B |

FIG. 11B

| employee ID | affiliation | name | occupational position | category of occupation | covering job | password |
|---|---|---|---|---|---|---|
| X01 | AB Company Ltd | ... | president | ... | ... | ... |
| X02 | division A | ... | manager | ... | ... | ... |
| X03 | division B | ... | manager | ... | ... | ... |
| X04 | department A1 | ... | chief | ... | ... | ... |
| X05 | department A1 | Tomihiko Azuma | worker | business | video | xxxxxxx |
| X06 | department A1 | ... | worker | ... | ... | ... |
| X07 | department A2 | ... | chief | ... | ... | ... |
| X08 | department A2 | ... | worker | ... | ... | ... |
| X09 | department A2 | ... | worker | ... | ... | ... |
| X10 | department B1 | ... | chief | ... | ... | ... |
| X11 | department B1 | ... | worker | ... | ... | ... |
| X12 | department B1 | ... | worker | ... | ... | ... |
| X13 | department B2 | ... | chief | ... | ... | ... |
| X14 | department B2 | ... | worker | ... | ... | ... |
| X15 | department B2 | ... | worker | ... | ... | ... |

FIG. 12

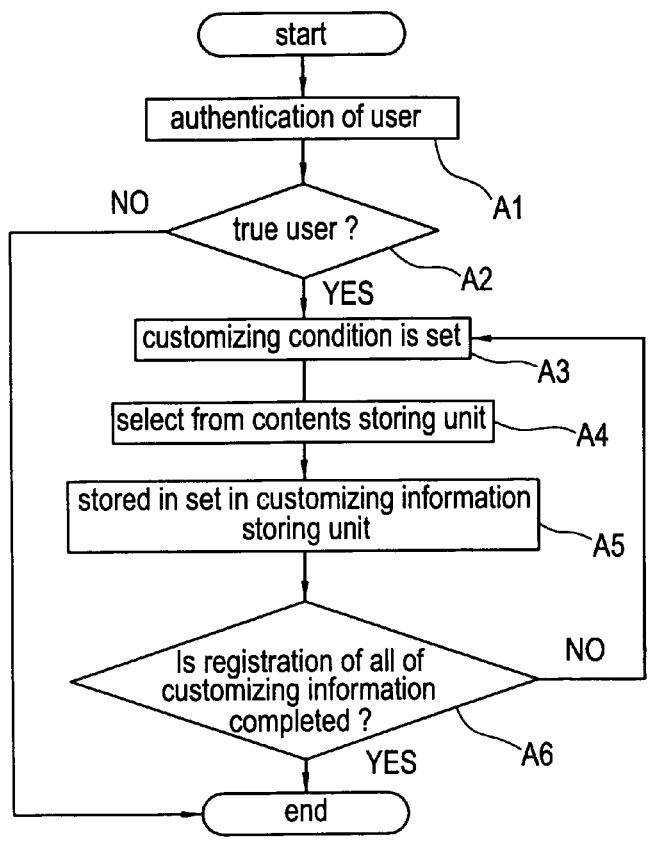

FIG. 13

| procedure | information |
|---|---|
| making of daily report of business | daily report of business |
| drafting plan of monthly order acceptance | trouble information |
| drawing up of estimate | sales scheme for every product |
| drafting of integrated schedule flowchart | sales strategy |
| making of explaining material | selling prices |
| drafting plan of sales scheme for every product | business efficiency at each sales location |
| drafting plan of equipment | immediate report of actual sales |
| evaluation of capability | actual reclamation of cash |
| making of licensing proposal material | actual balance of accounts receivable |
| drafting plan of sales strategy | |
| analysis of investment effect | |
| set share target | |

FIG. 14

| customizing condition | contents information ||
|---|---|---|
| | procedure | information |
| occupational position is a worker | making of daily report of business | sales scheme for every product |
| | drafting plan of monthly order acceptance | trouble information |
| | drawing up of estimate | selling prices |
| | drafting of integrated schedule flowchart | |
| | making of explaining material | |
| occupational position is a chief | drafting plan of sales scheme for every product | daily report of business |
| | drafting plan of equipment | trouble information |
| | evaluation of capability | sales scheme for every product |
| | making of licensing proposal material | immediate report of actual sales |
| | | actual reclamation of cash |
| | | actual balance of accounts receivable |
| occupational position is a manager | drafting plan of sales strategy | immediate report of actual sales |
| | analysis of investment effect | sales scheme for every product |
| | set share target | sales strategy |
| | | business efficiency at each sales location |

FIG. 15A

| customizing condition | contents information ||
|---|---|---|
| | procedure | information |
| belonging to division A | AP1, AP2 | AI1, AI2 |
| belonging to division B | BP1, BP2 | BI1, BI2 |
| belonging to department A1 | A1P1, A1P2 | A1I1 |
| belonging to department A2 | A2P1 | A2I1 |

FIG. 15B

| customizing condition | contents information ||
|---|---|---|
| | procedure | information |
| category of occupation is business, and covering job is a video | SVP1, SVP2 | SVI1 |
| belonging to division A and category of occupation is development | ADP1 | ADI1 |

FIG. 19

```
<? xml version="1.0" ?>
<company> <name> AB Company Ltd </name>
<person> <employee ID> X 01 </employee ID>
<occupational position> president </occupational position>
</person>
<division> <name> division A </name>
<person> <employee ID> X 02 </employee ID>
<occupational position> manager </occupational position>
</person>
<department> <name> department A1 </name>
<person> <employee ID> X 04 </employee ID>
<occupational position> chief </occupational position>
</person>
<person> <employee ID> X 16 </employee ID>
<name> Hiroyuki Kubota </name>
<occupational position> worker </occupational position>
<category of occupation> business </category of occupation>
<covering job>video </covering job >
<password> XXXXXXXX </password>
</person>
<person>...</person>...
</department>
<department> <name> department A2 </name>...
<person>...<person>...
</department>
</division>
<division> <name> division B </name>
<person> <employee ID> X 03 </employee ID>
<occupational position> manager </occupational position>
<person>
<department> <name> department B1 </name>
<person> <employee ID> X 10 </employee ID>
<occupational position> chief </occupational position>
</person>
<person>...</person>...
</department>
<department> <name> department B2 </name>...
<person>...</person>...
</department>
</division>
</company>
```

▨▨▨▨ part changed from organization definition information

FIG. 21

```xml
<? xml version="1.0" ?>
<company> <name> AB Company Ltd </name>
<person> <employee ID> X 01 </employee ID>
<occupational position> president </occupational position>
</person>
<division> <name> division A </name>
<person> <employee ID> X 02 </employee ID>
<occupational position> manager </occupational position>
</person>
<department> <name> department A1 </name>
<person> <employee ID> X 04 </employee ID>
<occupational position> chief </occupational position>
</person>
<person> <employee ID> X 16 </employee ID>
<name> Hiroyuki Kubota </name>
<occupational position> worker </occupational position>
<category of occupation> business </category of occupation>
<covering job> video </covering job >
<password>XXXXXXXX</password>
<person> <employee ID> X 17 </employee ID>
<name> Shyouiti Yoshikawa </name>
<occupational position> worker </occupational position>
<category of occupation> business </category of occupation>
<covering job> television </covering job >
<password>XXXXXXXX</password>
</person>
<person>... </person>...
</department>
<department> <name> department A2 </name>...
<person>... </person>...
</department>
</division>
<division> <name> division B </name>
<person> <employee ID> X 03 </employee ID>
<occupational position> manager </occupational position>
<person>
<department> <name> department B1 </name>
<person> <employee ID> X 10 </employee ID>
<occupational position> chief </occupational position>
</person>
<person>... </person>...
</department>
<department> <name> department B2 </name>...
<person>... </person>...
</department>
</division>
</company>
```

▨ part changed from organization definition information (1)

| customizing condition | contents information ||
|---|---|---|
| | procedure | information |
| belonging to division A | AP1, AP2 | AI1, AI2 |

(2)

| customizing condition | contents information ||
|---|---|---|
| | procedure | information |
| belonging to division A | AP1, AP2, AP3 | AI1 |

BUSINESS INFORMATION SYSTEM AND METHOD OF MANAGING BUSINESS INFORMATION

BACKGROUND OF THE INVENTION

1. Field of the Invention

The present invention relates to a business information system and a method of managing business information, both being adapted for use in managing internal business information in an enterprise.

2. Description of the Related Art

Hitherto, in customizing a business information system, either a method in which a system user individually customizes the system based on his or her personal preference or a method in which an administrator totally customizes the entire system in consideration of the easiness in operation of the system, is adopted.

Nevertheless, the above methods of the prior art have encountered the following problems. Namely, the business information system is a system for assisting an individual to execute a job in an enterprise, and therefore is in close relationship with the organization definition such as an occupational position, an occupational post, and covering duties. However, in the conventional business system, either an individual himself or her self or a system administrator has performed the customizing of the system irrespective of the organization definition, and accordingly the utilization environment of the individual has not coincided with the organization definition. Thus, there is either a problem such that the individual is not able to access any necessary information and procedure or a problem such that since a lot of unnecessary information is displayed, the necessary information is submerged.

Further, in the conventional business information system, the customizing function per se is extremely limited. Thus, the conventional business information system is not provided with any high customizing function such as customizing by using an attribute value constituting the occupational definition of an individual and customizing by using complex information obtained by combining the attribute values. Thus, it was impossible to carry out minute customizing in compliance with the occupational definition of the user, resulting in an occurrence of a problem such that optimum utilization environment can be provided.

Furthermore, in the business information system in which each of the individuals respectively customizes his or her utilization environment, the customized information is stored and administrated by every individual. Therefore, when personnel changes and organization changes occur, it is necessary to individually correct the respective information. Thus, there is either a problem such that an extensive amount of correction cost must be incurred or a problem such that organic reuse of the customized information cannot be effected at all. When personnel changes occur, the predecessor takes the customized information on the utilization environment to his or her new destination where he or she is moved. As a result, the successor must reconstruct another customized information on utilization environment for executing his or her new job.

SUMMARY OF THE INVENTION

Therefore, the present invention aims to provide a business information system capable of solving the afore-mentioned problems, and more specifically, an object of the present invention is to provide a business information system and a method of managing business information whereby an optimum environment of the individuals may be provided.

In order to solve the above-described problems, the present invention is characterized by comprising:

an organization definition information storing unit for storing organization definition information for defining an organization;

a contents storing unit for storing contents consisting of either a procedure or information provided for users or both of them;

a customizing information storing unit for storing in set, as customizing information, a customizing condition set as information customizing an utilization environment by using arbitrary organization definition information stored in the organization definition information storing unit, and information for indicating contents to be provided as utilization environment in a case where the customizing condition is established;

an organization definition information registering means for storing input organization definition information in the organization definition information storing unit;

a customizing information registering means for storing in set, as customizing information, input customizing condition and information indicating contents to be provided in a case where the customizing condition is established, in the customizing information storing unit; and a personal environment constructing means for acquiring the customizing information from the customizing information storing unit, for judging whether or not the customizing condition is established with regard to each user by utilizing the organization definition information stored in the organization definition information storing unit, and for acquiring the contents stored in set together with the customizing condition from the contents storing unit in a case where the customizing condition is established, thereby adding the acquired contents to a personal environment of the user.

Also, the present invention is characterized in that the organization definition information comprises at least one of information representing an organization hierarchy, information representing partial organization, information representing distribution of personnel, and information relative to a job of each of the individuals. The present invention is characterized in that the information relative to the job of each of the individuals comprises information representing at least one of an employee identification number, a name, an occupational position, a covering job, a function, a duty, a knowledge, an experience, and a location. The present invention is characterized in that the organization definition information storing unit stores authentication information indicating that each of the individuals is a true user of the business information system, and that at least one of the organization definition information registering means, the customizing information registering means and the personal environment constructing means executes the processing only when a user is a true user of the business information system, on the basis of the input authentication information of the user. The present invention is characterized in that the customizing condition is capable of being defined by a complex condition, which is a combination of a plurality of conditions.

Further, the present invention is characterized in that, by the use of an organization definition information storing unit for storing an organization definition for defining an organization, a contents storing unit for storing contents consisting of either a procedure or information provided to users or both of them, and a customizing information storing unit for storing in set, as customizing information, a customizing condition set as information customizing an utilization environment by using arbitrary organization definition information stored in said organization definition information storing unit, and information for indicating contents to be provided as utilization environment in a case where the customizing condition is established, there are provided an organization definition information registering step for storing input organization definition information in the organization definition information storing unit, a customizing information registering step for storing in set, as the customizing information, input customizing condition and information indicating contents to be provided in a case where the customizing condition is established, in the customizing information storing unit, and a personal environment constructing step for acquiring the customizing information from said customizing information storing unit, for judging whether or not the customizing condition is established with regard to each user by the utilization of the organization definition information stored in the organization definition information storing unit, and for acquiring the contents stored in set together with the customizing condition from the contents storing unit in a case where the customizing condition is established, thereby adding the acquired contents to the personal environment of the user.

The present invention has advantageous effects described hereinbelow.

A first advantageous effect is a capability of providing a user of the business information system with an optimum utilization environment for the execution of a job.

The reason for such effect is because an utilization environment consisting of only information and procedure necessary for the execution of the job can be provided by customizing the utilization environment of the business information system on the basis of an organization definition such as an occupational position and an occupational post of each of the individuals, and covering duties of the individual.

Further, due to the provision of a high customizing function such as the customizing by the attribute value constituting an occupational definition of the user and the customizing by using a complex condition obtained by combining a plurality of conditions, the optimum utilization environment for the execution of the job can be provided.

A second advantageous effect is a capability of extensively curtailing a cost for changing the utilization environment of the individuals due to the personnel transfers and the changes in the organization.

The reason for the second effect is because the organization definition information administrated by the personnel department is directly used as a condition for customizing the utilization environment. When the personnel transfers and the changes in the organization occur, if e.g., the personnel department only changes the organization definition information, the customizing of the environment of the individuals on the basis of the new organization definition information can immediately become effective. Another reason for the second effect is because the customizing information is not subordinate to a specified individual but is used for defining qualities that constitute jobs of individuals so that the customizing information may be systematically re-used. Thus, the successor of a certain job may automatically succeed the personal environment of the predecessor. Further, due to a unitary management of the customizing information, the personal environments of all of the associated users may be altered by only once changing the customizing information, and accordingly it is not necessary for each of the individuals to respectively change the utilization environment thereof.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 2 is a diagrammatical view illustrating an exemplary construction of organization definition information stored in organization definition information storing unit 31 of FIG. 1;

FIG. 5 is a diagrammatic view illustrating an example of the organization definition information of FIGS. 3 and 4 represented in the extensible markup language (XML);

FIG. 6 is a diagram illustrating definition on the tag set of the XML shown in FIG. 5;

FIG. 7 is a view illustrating the construction of the XML document shown in FIG. 5;

FIG. 9 is a diagrammatic view illustrating an example of the directory tree of FIG. 8, represented all over again by the LDAP Data Interchange Format (LDIF);

FIG. 10 is a diagram illustrating the definition on the attribute of the LDAP used in FIGS. 8 and 9;

FIG. 11 is a diagrammatic view of an example of the organization definition information of FIGS. 3 and 4, represented in the style of table, in which FIG. 11(1) represents the construction of the organization of the "AB Company", and FIG. 11(2) represents the distribution of personnel and personal information;

FIG. 12 is a flow chart illustrating an operation for registering the customizing information in the construction of FIG. 1;

FIG. 13 is a diagrammatic view illustrating an example of the contents stored in the contents storing unit of FIG. 1;

FIG. 14 is a diagrammatic view illustrating an example of the customizing information stored in the customizing information registering unit of FIG. 1;

FIGS. 15(A) and 15(B) are diagrammatic views illustrating another example of the customizing information stored in the customizing information registering unit of FIG. 1;

FIG. 19 is a diagram illustrating the result of the personnel changes including the retirement of "X05" and the assignment of "X16", which is reflected against the organization definition information stored in the organization definition information storing unit shown in FIG. 5 by the organization definition information registering means;

FIG. 21 is a diagram illustrating the result of the changes of personnel, which includes the assignment of the employee "X17", reflected against the organization definition information stored in the organization definition information storing unit as shown in FIG. 19 by the organization definition information registering means;

DETAILED DESCRIPTION OF THE PREFERRED EMBODIMENTS

The description of the business information system according to several embodiments of the present invention will be provided hereinafter with reference to the accompanying drawings.

The Construction of the Embodiment

Figure 1:
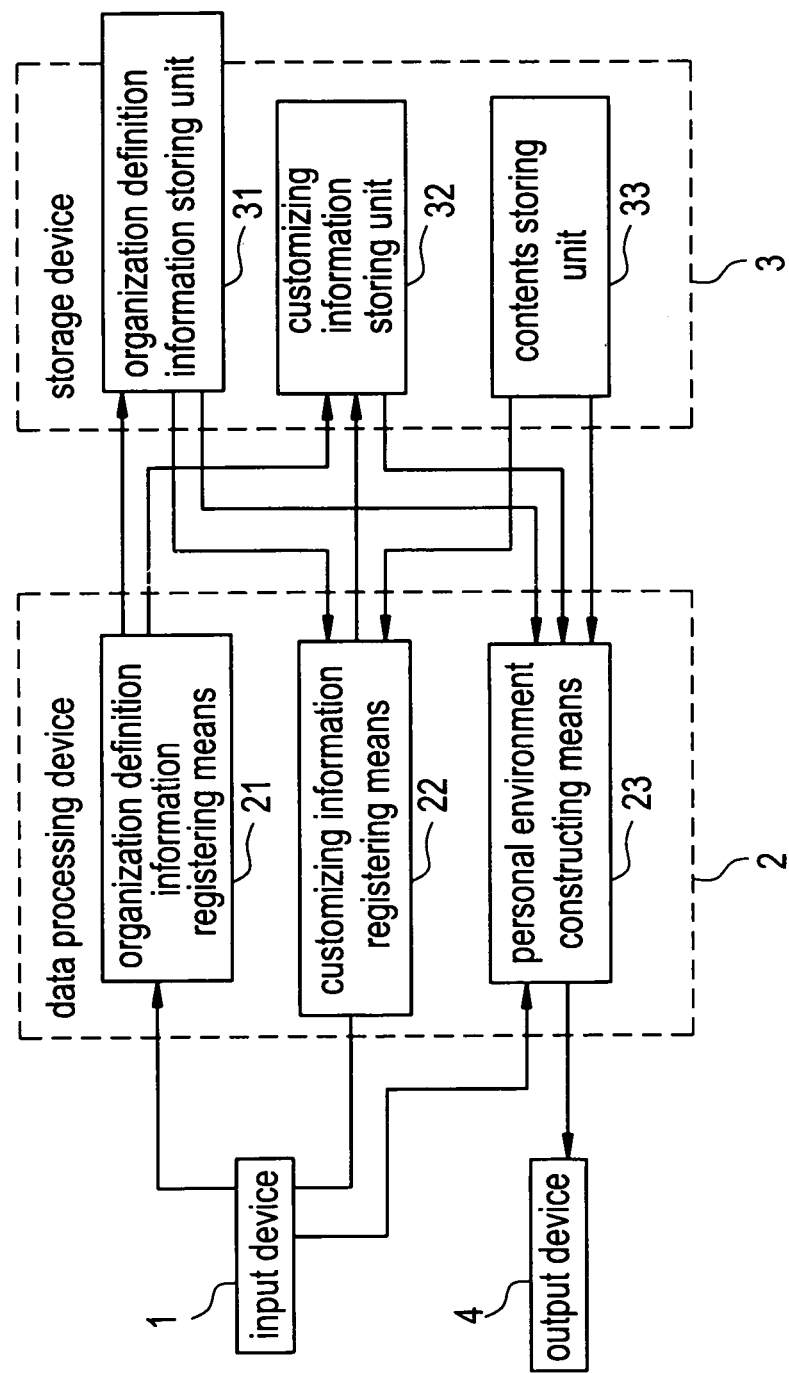
FIG. 1 is a block diagram illustrating the construction of a business information system according to an embodiment of the present invention.

Referring to FIG. 1, the embodiment of the present invention includes input device 1 which is constituted by an operational element such as a keyboard of a personal computer, a portable telephone, and a portable information terminal unit, data processing device 2 operated by a program control, storage device 3 for storing information, and output device 4 which is constituted by a display device of a personal computer, a displaying unit of a portable telephone or that of a portable information terminal unit. Data processing device 2 and input and output devices 1 and 4 may be connected by either wire or radio, and might be connected via the network of the Internet.

Storage device 3 is provided with organization definition information storing unit 31, customizing information storing unit 32, and contents storing unit 33.

Organization definition information storing unit 31 stores therein the entire information on an organization such as the organization hierarchy, the partial organization, and the distribution of personnel, the personal information such as the employee ID (employee identification code), the names, the occupational positions, the category of occupation, the covering job, the function, the duty, and the knowledge of individuals, and the password used as an authentication information when each of individuals utilizes the business information system.

Customizing information storing unit 32 stores therein a set of the customizing conditions which are set by using an arbitrary organization definition information stored in organization definition information storing unit 31, and the contents information such as procedures and information added to the personal environment of users (i.e., the environment when each of the individuals utilizes the business information system, e.g., a displaying condition of the display and so on) when the customizing conditions are satisfied or established.

Contents storing unit 33 stores therein all contents such as the procedures and information that are provided by the business information system to the users.

Data processing device 2 is provided with organization definition information registering means 21 corresponding respectively to respective functions realized by the program control and customizing information registering means 22, and personal environment constructing means 23.

Organization definition information registering means 21 receives, from input device 1, the entire information on the organization such as the organization hierarchy, the partial organization, and the distribution of personnel, the personal information such as the employee ID (employee identification code), the names, the occupational position, the category of occupation, the covering job, the function, the duty, and the knowledge of individuals, and the password used as an authentication information when each of the individuals utilizes the business information system, and stores the received information and password in organization definition information storing unit 31.

Customizing information registering means 22 receives the employee ID and the password from input device 1 as authentication information of a user, and after confirming that the user is a true user of the business information system, stores in set, as information for customizing the utilization environment of the business information system, the customizing condition which is set by using arbitrary organization definition information stored in organization definition information storing unit 31 and the contents information such as the procedure and information added to the personal environment of the user in a case where the customizing condition is established or satisfied, in customizing information storing unit 32.

Personal environment constructing means 23 receives the employee ID and the password from input device 1 as authentication information of a user, and after confirming that the user is a true user of the business information system, obtains the customizing information from customizing information storing unit 32, to inspect whether or not the customizing condition is satisfied with the user by the use of the organization definition information stored in organization definition information storing unit 31. When it is inspected that the customizing condition of the user is satisfied or established, personal environment constructing means 23 further obtains the contents information that is stored in set together with the customizing condition from customizing information storing unit 32 to thereby acquire the contents such as the procedures and information from contents storing unit 33 and add them to the personal environment of the user. If it is confirmed that the customizing condition described above is not satisfied by the result of the inspection, personal environment constructing means 23 takes no action at all. Personal environment constructing means 23 executes inspection as to whether or not the associated customizing condition is satisfied on all of the customizing information stored in customizing information storing unit 32, and processing of adding the contents to the personal environment when the customizing condition is respectively satisfied and established. Thereafter, personal environment constructing means 23 displays these personal environments on output device 4.

The Operation of the Embodiment

The operation of the embodiment will be provided hereinbelow in detail with reference to FIGS. 1, 2, 3, 4, 5, 6, 7, 8, 9, 10, 11, 12, 13, 14, 15(A) and 15(B), 16, 17, 18, 19, 20, 21, 22, 23, and 24.

First of all, the concrete content of the organization definition information will be described in detail with reference to FIGS. 1, 2, 3, 4, 5, 6, 7, 8, 9, 10 and 11.

FIG. 2 is a diagrammatic view illustrating an example of the construction of the organization definition information stored in organization definition information storing unit 31 in the business information system of the present invention in a state where the information is divided into categories of a division, an item, and content.

Referring to FIG. 2, the entire information representing a total definition of an organization is constituted by information concerning the hierarchy of organization representing upper and lower relationship in a partial organization, information concerning the partial organization such as business divisions and divisions which are provided for each business territory and each functional region, and information concerning distribution of personnel in the entire organization. Information concerning individuals belonging to the organization is constituted by employee ID for definitely identifying each of the individuals, names of individuals, information concerning the occupational positions such as managers and chiefs, information concerning the category of occupation such as business, development and so on, information concerning works such as products and customers, information concerning the functions to be executed as occupational duties, information concerning the duty to be accomplished in the organization, information concerning the knowledge of individuals such as titles and techniques of individuals, information concerning the experiences such as projects charged to individuals in the past and customers of individuals, and information concerning the locations of individuals such as the telephone numbers and electronic mail (E-mail) addresses.

In the example shown in FIG. 2, the information concerning the partial organization is constructed so as to include information representing the name of organization, the business territory, the functional region, responsibility, powers, and the heads, and the information concerning the distribution of personnel is constructed so as to include information representing the affiliation, the management span, and proper/additional occupational positions.

The information concerning the individuals has the following construction. Namely, the employee ID includes information representing numbers and codes for definitely and individually identifying individuals, and the information concerning the occupational position includes information representing a director, a division manager, a manager, a chief, and a worker. Further, the information concerning the occupational category includes information representing a business, a development, and a customer support, and the information concerning the covering job includes information representing products, customers, areas, and processes. The information concerning the functions includes information representing consulting, order management, sales plan, and comprehending of accomplishment, and the information concerning the duty includes information representing periodic reporting, meeting of exception, and secret-holding regulation. The information concerning the knowledge includes information representing titles, techniques, a special field, and a language ability, and the information concerning the experience includes information representing projects, customers, techniques, and areas. Further, the information concerning the location includes information representing the address, the telephone number, FAX, and E-mail.

Figures 3, 4:
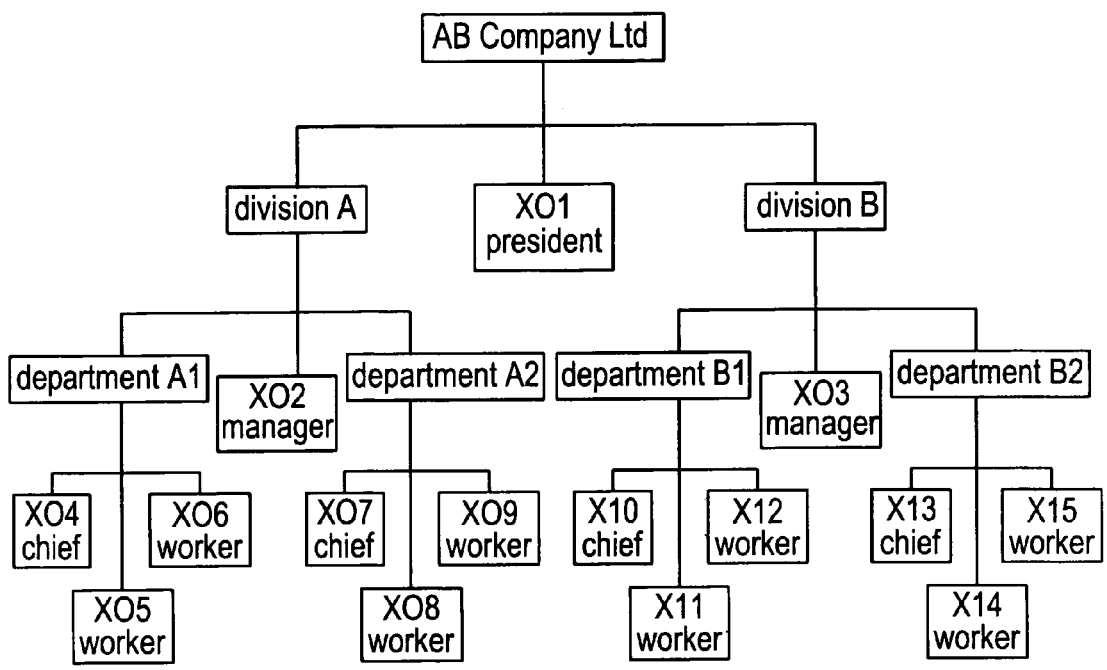
FIG. 3 is a tree diagram illustrating an example of information concerning an organization hierarchy and a distribution of personnel stored in organization definition information storing unit 31 of FIG. 1.
FIG. 4 is a diagrammatic view illustrating an example of individual information stored in organization definition information storing unit 31 of FIG. 1.

FIG. 3 is an example of the information concerning the organization hierarchy and distribution of personnel stored in organization definition information storing unit 31. Further, FIG. 3 represents the organization hierarchy of the enterprise named "AB Company Ltd." in a reverse tree fashion, and the upper and lower positional relationship in the drawing represents the upper and lower relationship in the organization hierarchy. It will be understood from FIG. 3 that the AB Company Ltd. is constituted by the divisions A and B, in which the division A is constituted by the departments A1 and A2, and the division B is constituted by the departments B1 and B2. Further, in FIG. 3, as the top of the AB Company Ltd., a person having the employee ID of "X01" is arranged under the occupational position of the president. Further, as the tops of the divisions "A" and "B", persons "X02" and "X03" are arranged under the occupational position of the manager, respectively. Similarly, as the tops of the departments "A1", "A2", "B1", and "B2", persons "X04", "X07", "X10", and "X13" are arranged under the occupational position of chief, respectively. The persons "X05" and "X05" whose occupational position is the worker belong to the department "A1", the persons "X08" and "X09" belong to the department "A2", the persons "X11" and "X12" belong to the department "B1", and the persons "X14" and "X15" belong to the department "B2", respectively.

FIG. 4 is an example of the personal information stored in organization definition information storing unit 31. In the example of FIG. 4, as the attribute of the personal information, the employee ID ("X05"), the name ("Tomihiko Azuma") the occupational position ("the worker"), the category of occupation ("business"), and the covering job ("video") are stored, and the password is simultaneously stored as the authentication information of the user.

FIG. 5 is an example of representation of the organization definition information of FIGS. 3 and 4 in XML (Extensible Markup Language). FIG. 6 illustrates the definition concerning the tag set of XML used in FIG. 5. In accordance with the definition of FIG. 6, in FIG. 5, the definition of the company (co.,) is defined in a region enclosed by <company> and </company>. Similarly, the definition of the division is defined in a region enclosed by <division> and </division>, the definition of the department is defined in a region enclosed by <department> and </department> and the definition of the name of the organization is defined in a region enclosed by <title> and </title>.

Similarly, the definition of an individual is defined in a region enclosed by <person> and </person>, the definition of the employee ID of an individual is defined in a region enclosed by <employee ID> and </employee ID>, and the definition of the name of an individual is defined in a region enclosed by <name> and </name>. Further, the definition of the occupational position of an individual is defined in a region enclosed by <occupational position> and </occupational position>, the definition of the category of occupation of an individual is defined in a region enclosed by <category of occupation> and </category of occupation>, the definition on the covering job of an individual is defined in a region enclosed by <covering job> and </covering job>, and the definition of the password of an individual is defined in a region enclosed by <password> and </password>.

FIG. 7 is a diagram indicating the construction of the XML document in FIG. 5. In the example shown in FIG. 7, the element indicated by the tag "the company" includes the respective elements indicated by tags "name", "person", and "division", the element indicated by the tag "division" includes the respective elements indicated by the tags "name", "person", and "department", and the element indicated by the tag "department" includes the respective elements indicated by the tags "name" and "person". Further, the element indicated by the tag "person" includes the respective elements indicated by the tags "employee ID", "name", "occupational position", "category of occupation", "covering job", and "password".

In FIG. 5, in accordance with the constructional definition in FIG. 7, the information on the upper and lower relationship and the distribution of personnel in the partial organization are indicated by the inclusive relationship of the tags. For example, between <company> and </company> for representing the definition of the "AB Company", the regions below are included, i.e., the region enclosed by <person> and </person> for representing the president, the region enclosed by <division> and </division> for representing the "division A", and the region enclosed by <division> and </division> for representing the "division B". Thus, it is represented that the president of the "AB Company" is "X01", and that the "AB Company" is constituted by the "division A" and "division B". Similarly, between <division> and </division> for representing the definition of "division A", the two regions, i.e., the region enclosed by <person> and </person> for representing the manager "X02", and the region enclosed by <department> and </department> for representing "department A1" and "department A2" are included, and between <division> and </division> for representing the definition of "division B", the two regions, i.e., the region enclosed by <person> and </person> for representing the manager "X03", and the region enclosed by <department> and </department> for representing "department B1" and "department B2" are included.

Between <department> and </department> for representing the definition of "department A1", a plurality of regions enclosed by <person> and </person> for representing the definition of the department chief and the worker are defined, and the distribution of personnel in "department A1" is represented.

Figure 8:
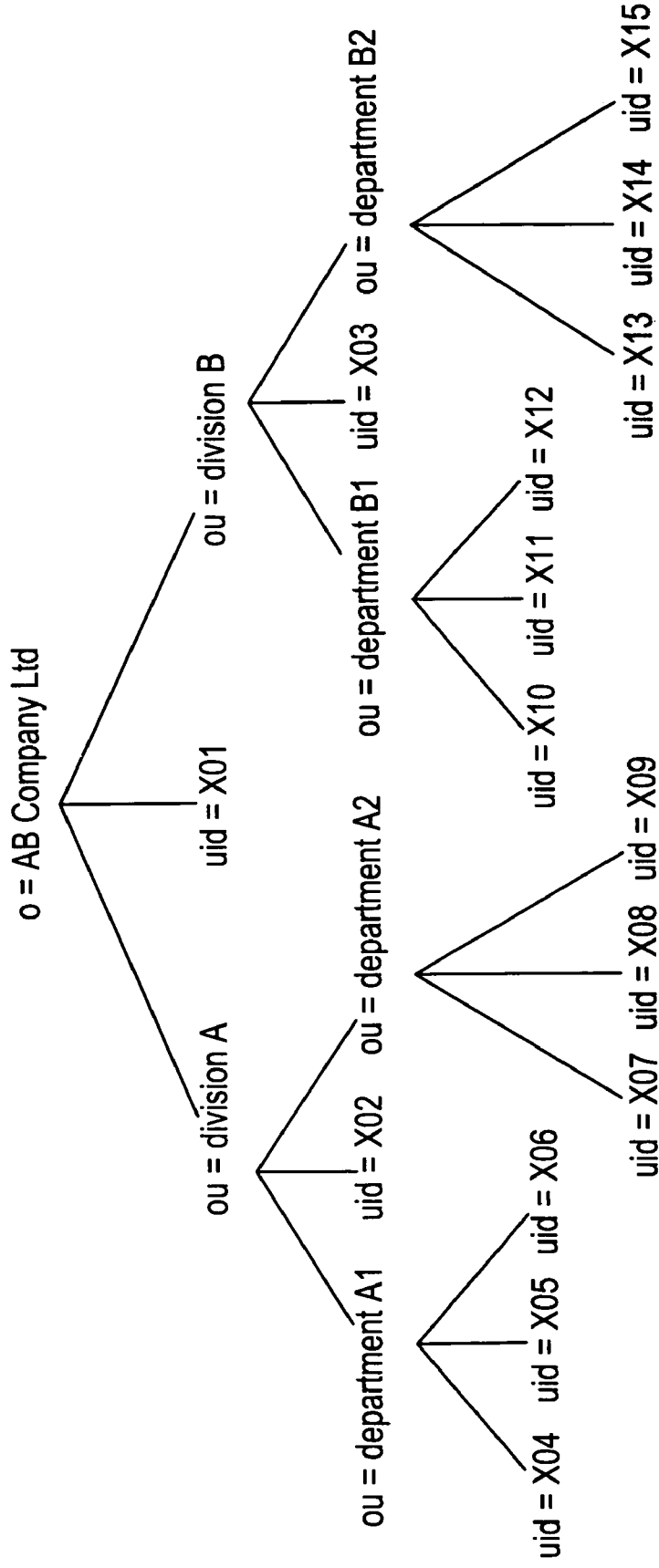
FIG. 8 is a tree diagram illustrating an example of the organization definition information of FIGS. 3 and 4, represented by a directory tree of the lightweight directory access protocol (LDAP) server.
Figure 16:
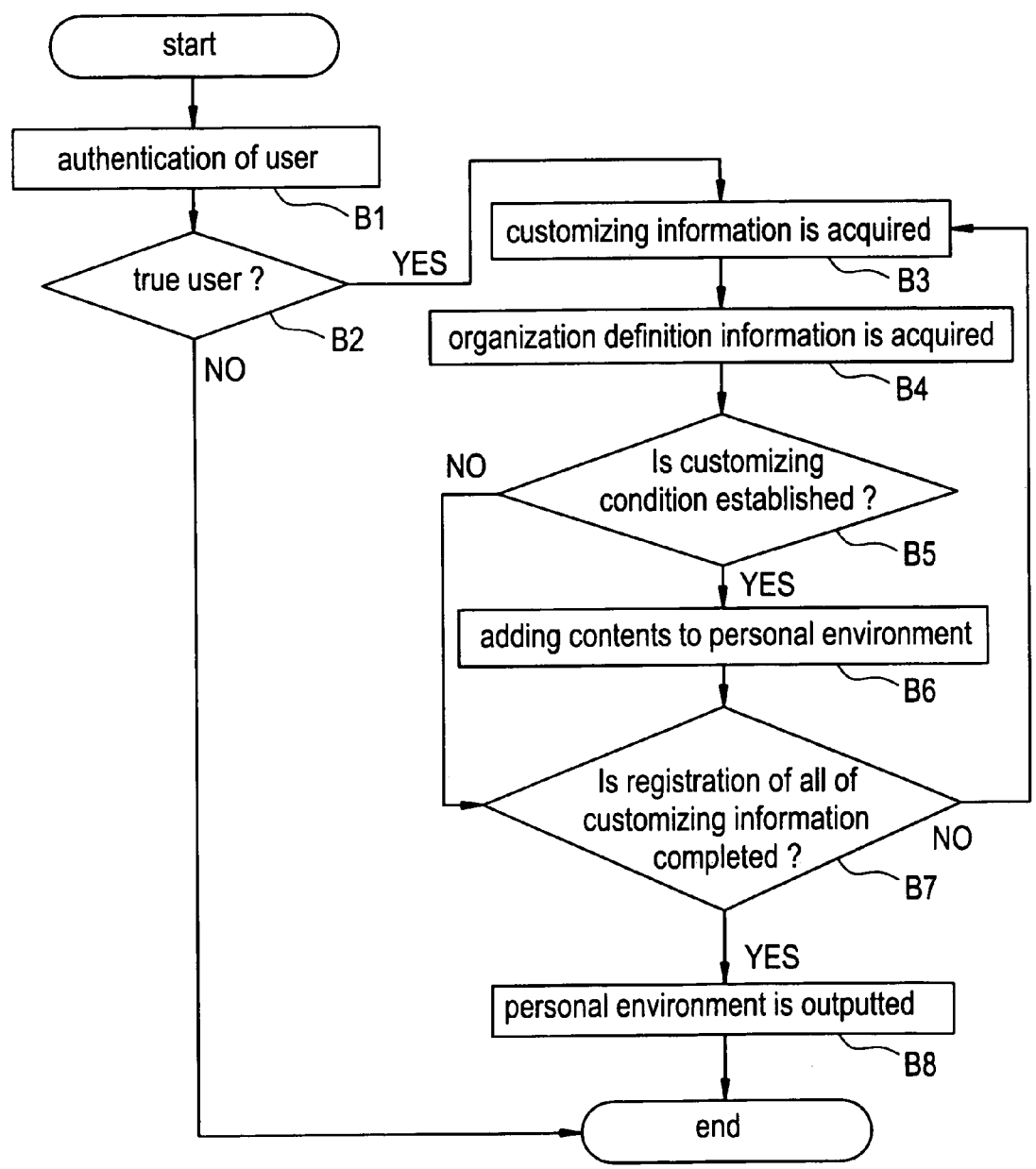
FIG. 16 is a flow chart illustrating the operation for constructing the personal environment of the users in the construction of FIG. 1.

FIG. 8 is an example of the organization definition information of FIGS. 3 and 4, expressed in a directory tree of the LDAP (Lightweight Directory Access Protocol) server. In FIG. 8, the company is represented by an identification data "o=AB Company", and the partial organization such as division and department are represented by identification data "ou=A division" and "ou=A1 department". A person is represented by an identification data such as "uid=X01" using the employee ID.

FIG. 9 is an example in which the directory tree of FIG. 8 is represented all over again in LDIF (LDAP Data Interchange Format) for the purpose of explaining the organization definition information concerning individuals of which the explain is omitted in FIG. 8. In FIG. 9, the organization definition information concerning individuals of which the explanation of which is omitted in FIG. 8 is represented by the attributes such as "cn", "title", "category", "product", and user password".

FIG. 10 illustrates the definition concerning the attributes of LDAP used in FIGS. 8 and 9. In this case, the attribute "dn" represents "an identification data of an object", the attribute "objectclass" represents "a class of an object", the attribute "o" represents "the name of the Company", the attribute "ou" represents "the name of the organization", the attribute "uid" represents "the employee ID of an individual", the attribute "cn" represents "the name of an individual", the attribute "title" represents "the occupational position of an individual" the attribute "category" represents "the category of occupation of an individual", the attribute "product" represents "the covering job of an individual", and the attribute "user password" represents "the password of an individual", respectively.

FIG. 11 is an example in which the organization definition information of FIGS. 3 and 4 is expressed in the style of table. The table (1) in FIG. 11 represents the construction of the organization of the "Company AB", and table (2) in FIG. 11 represents the distribution of personnel and the personal information.

Now, the operation for registering the customizing information will be described in detail with reference to FIGS. 1, 2, 5, 12, 13, 14 and 15(A) and 15(B). The name of user and the password input from input device 1 are supplied to customizing information registering means 22 for the authentication of the user (Step A1 in FIG. 12), and an inspection as to whether or not the user is a true user is executed by the use of the personal information stored in organization definition information storing unit 31 (Step A2). When it is judged that the user is not a true user, the operation is immediately terminated.

When it can be confirmed that the user is a true user, the customizing condition is set by the use of arbitrary organization definition information stored in organization definition information storing unit 31 (Step A3). Organization definition information storing unit 31 stores therein the information on the organization definition as shown in the example of the construction of organization definition information of FIG. 2, and designates the customizing condition by the use of such organization definition information. For example, the condition "the occupational position is a worker" and the condition "belonging to division A" can be designated as the customizing condition. Further, a complex condition consisting of a combination of a plurality of conditions may be designated as the customizing condition. For example, the complex condition "the category of occupation is business, and the covering job is a video" may be designated as the customizing condition.

Thereafter, when the customizing condition is established, the procedure and the information to be added to the personal information of the user are selected from contents storing unit 33 (Step A4).

FIG. 13 illustrates an example of the contents stored in contents storing unit 33. In FIG. 13, "making of daily report of the business" and "drafting plan of monthly order acceptance" are stored as the procedure that the business information system provides the user, and "daily report of the business" as well as "trouble information" is stored as the information that the same system provides the user.

Subsequently, the customizing condition and the contents information are stored in set in customizing information storing unit 32 (Step A5). FIG. 14 illustrates an example of the customizing information stored in customizing information storing unit 32. In FIG. 14, the occupational position of the organization definition information is used as the customizing condition. In organization definition information storing unit 31, the personal information as shown in FIG. 5 is stored as an organization definition information, and the customizing condition can be designated by the use of the organization definition information as shown in FIG. 5. In FIG. 14, when the customizing condition "the occupational position is a worker" is satisfied or established, the customizing information is defined so that "making of daily report of the business", "drafting a plan of monthly acceptance of order", "drawing up of an estimate", "drafting of an integrated schedule flowchart", and "making of explaining material" are added as the procedure to, and "sales scheme for every product", "trouble information", and "selling prices" are added as the information to the personal environment of the user. Similarly, the set of the customizing condition and the contents information stating, "the occupational position is a chief", and the set of the customizing condition and the contents information stating, "the occupational position is a manager" are defined, and therefore appropriate contents may be added to the personal environment in compliance with the occupational position of the user.

FIGS. 15(A) and 15(B) illustrate another example of the customizing condition stored in customizing information storing unit 32. In the table of FIG. 15(A), the information on the distribution of personnel is used as the customizing condition. In organization definition information storing unit 31, the information on the organization hierarchy and the distribution of personnel as shown in FIG. 5 is stored, and therefore by the use of such information, the customizing condition may be designated. In the table (1) of FIG. 15(A), for example, the customizing condition stating "belonging to the division A" is established, the customizing information is defined so that "AP1" and "AP2" are added as the procedure to, and "Al 1" and "Al 2" are added as the information to the personal environment of the user. The table of FIG. 15(B) illustrates an example in which a complex condition consisting of a combination of a plurality of conditions is designated as the customizing condition. In the table of FIG. 15(B), for example, when the customizing condition stating, "the category of occupation is business, and the covering job is a video" is established, the customizing information is defined so that "SVP 1" and "SVP 2" are added as the procedure to, and "SVI 1" is added as the information to the personal environment of the user.

After the termination of registration of one customizing information, if further separate customizing information is needed to be registered, the operational flow starting from the Step A3 is repeated, and the registration of all of the customizing information is completed, the operation is terminated (Step A6).

Now, the operation for constructing the personal environment of a user will be described hereinbelow in detail, with reference to FIGS. 1, 5, 14, 15(A), 15(B), 16 and 17.

The name of a user and the password input from input device 1 are supplied to personal environment constructing means 23 for the authentication of the user (Step B1 in FIG. 16), an inspection as to whether or not the user is a true user is executed by the use of the personal information stored in organization definition information storing unit 31 (Step B2). When it is judged that the user is not a true user, the operation is immediately terminated.

When it can be confirmed that the user is a true user, unevaluated customizing information is acquired from customizing information storing unit 32 (Step B3). Thereafter, the organization definition information designated as the customizing condition is acquired from organization definition information unit 31 (Step B4), and an inspection is executed as to whether or nor the customizing condition is established (Step B5). When the customizing condition is established, the contents information stored in set together with the customizing condition is used to acquire the corresponding contents from contents storing unit 33 thereby adding the acquired contents to the personal environment of the user (Step B6), while when the customizing condition is not established, the addition of the contents is not effected. When any unevaluated customizing information remains in customizing information storing unit 32, the operational flow from the Step B3 is repeated for such unevaluated customizing information (Step B7), and when any unevaluated customizing information does not remain, the personal environment of the user is outputted to output device 4 (Step B8), the operation for constructing the personal environment is terminated.

Figure 17:
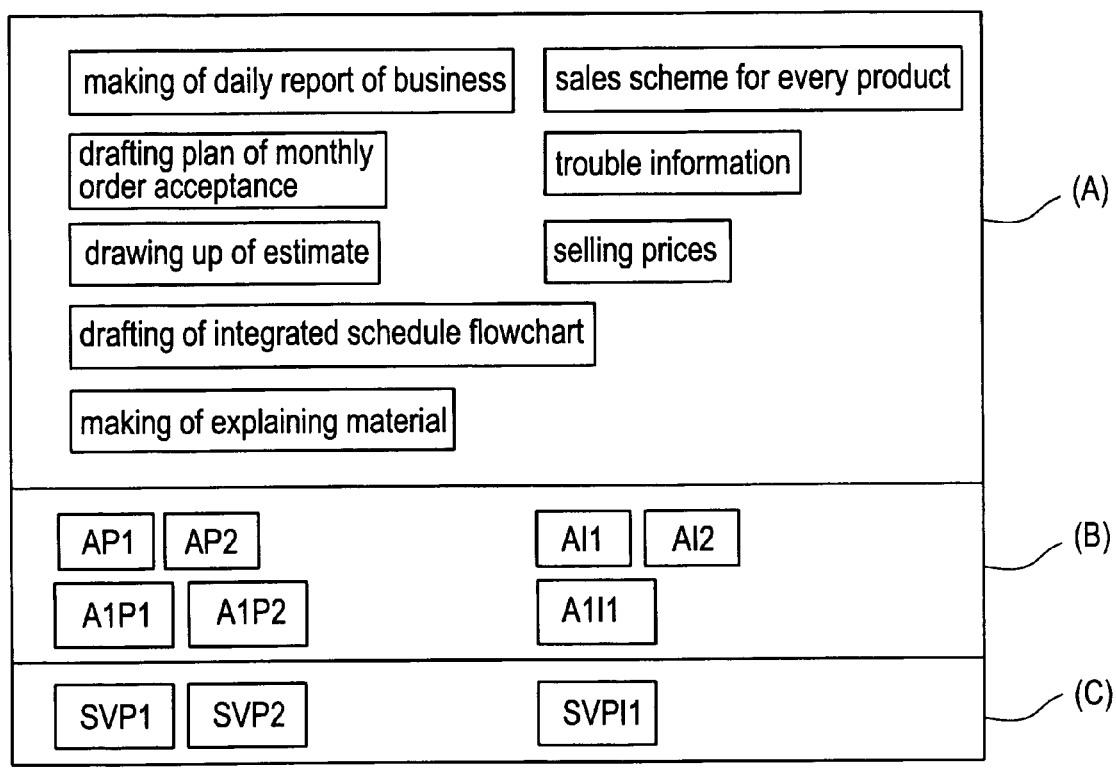
FIG. 17 is an explanatory diagram illustrating the organization definition information of FIG. 5 and an example in constructing the personal environment for the user whose employee ID is "X05" in a case where the customizing information shown in FIGS. 14 and 15(A) and 15(B) is used.

FIG. 17 illustrates an example in which the construction of the personal environment of the user whose employee ID is "X05", is executed by the use of the organization definition information as shown in FIG. 5 and the customizing information as shown in FIGS. 14 and 15(A) and 15(B). Since the person "X05" is defined in FIG. 5 in such a manner that the occupational position thereof is "worker", the customizing condition stating, "the occupational position is a worker" in the customizing information of FIG. 14 is established, and the procedure and the information corresponding to the customizing condition are added to the personal environment of "X05" ((A) in FIG. 17). Further, since the "X05" belongs to "the division A" and "the department A1" in FIG. 5, the customizing condition stating, "belonging to the division A" as well as the customizing condition stating, "belonging to the department A1" as listed in the customizing information in the table 15(A) are established, and therefore the procedure and the information corresponding to the respective conditions are added to the personal environment ((B) in FIG. 17). Similarly, by the organization definition information of FIG. 5, the customizing condition stating, "the category of occupation is business, and the covering job is a video" as listed in the table of FIG. 15(B) is established, and the procedure and the information corresponding to the customizing condition are added to the personal environment ((C) in FIG. 17).

Finally, the systematical reuse of the customizing information will be described with reference to FIGS. 1, 3, 14, 15(A), 15(B), 18, 19, 20, 21, 22. 23 and 24.

Figure 18:
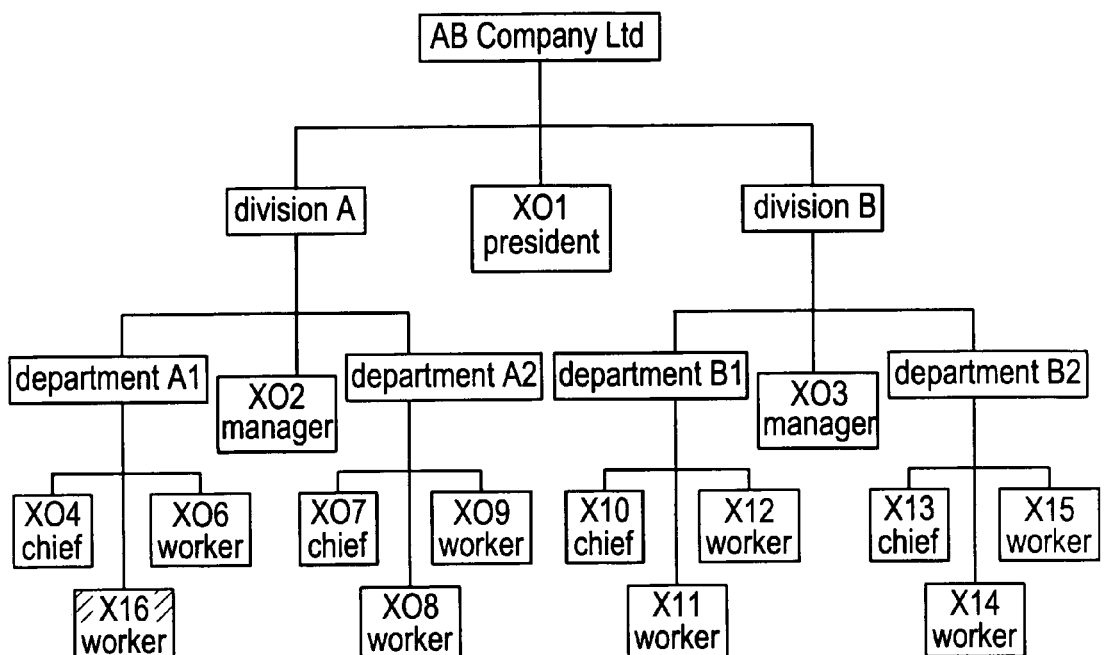
FIG. 18 is a tree diagram illustrating an example of information concerning the organization hierarchy and the distribution of personnel, which are stored in the organization definition information storing unit 31 of FIG. 1, in a case where an employee whose employee ID is "X16" is assigned to A1 department of A division as a successor of an employee whose employee ID is "X05"

FIG. 18 illustrates an example of the state in which the employee whose employee ID is "X05" has been resigned or retired, and the employee whose employee ID is "X16" is assigned as a successor to the department A1 of the division A. FIG. 19 illustrates the result of the personal changes including the retirement of "X05" and the assignment of "X16" reflected by organization definition information registering means 21 against the organization definition information as shown in FIG. 5 and stored in organization definition information storing unit 31.

A hatched portion in FIG. 19 indicates a part changed from the organization definition information as shown in FIG. 5.

Referring to FIG. 19, it is understood that the attribute value concerning the affiliation, the occupational position, the category of occupation, and the covering job of "X16" is the same as that of "X05". When the customizing information of FIGS. 14 and 15(A) and 15(B) is referred to, four kinds of attribute values including the affiliation (FIG. 15(A)), the occupational position (FIG. 14), the category of occupation (FIG. 15(B)), and the covering job (FIG. 15(B)) in the organization definition information are used as the customizing condition, and the customizing information is defined so that these four kinds of attribute values provide the same user with the same using environment. Further, the customizing information of FIGS. 14 and 15(A) and 15(B) is stored in customizing information storing unit 32 to be unitarily controlled, and accordingly no adverse affect on the customizing information occurs from the resignation of "X05" while enabling the whole of the organization to reuse it. Therefore, after the organization definition information is updated, when the operation of personal environment constructing means 33 is executed against the newly assigned person "X16", the customizing information in FIGS. 14 and 15(A) and 15(B) is reused, so that the personal environment the same as that shown in FIG. 17 and having been used by "X05" can be automatically supplied to "X16".

Figure 20:
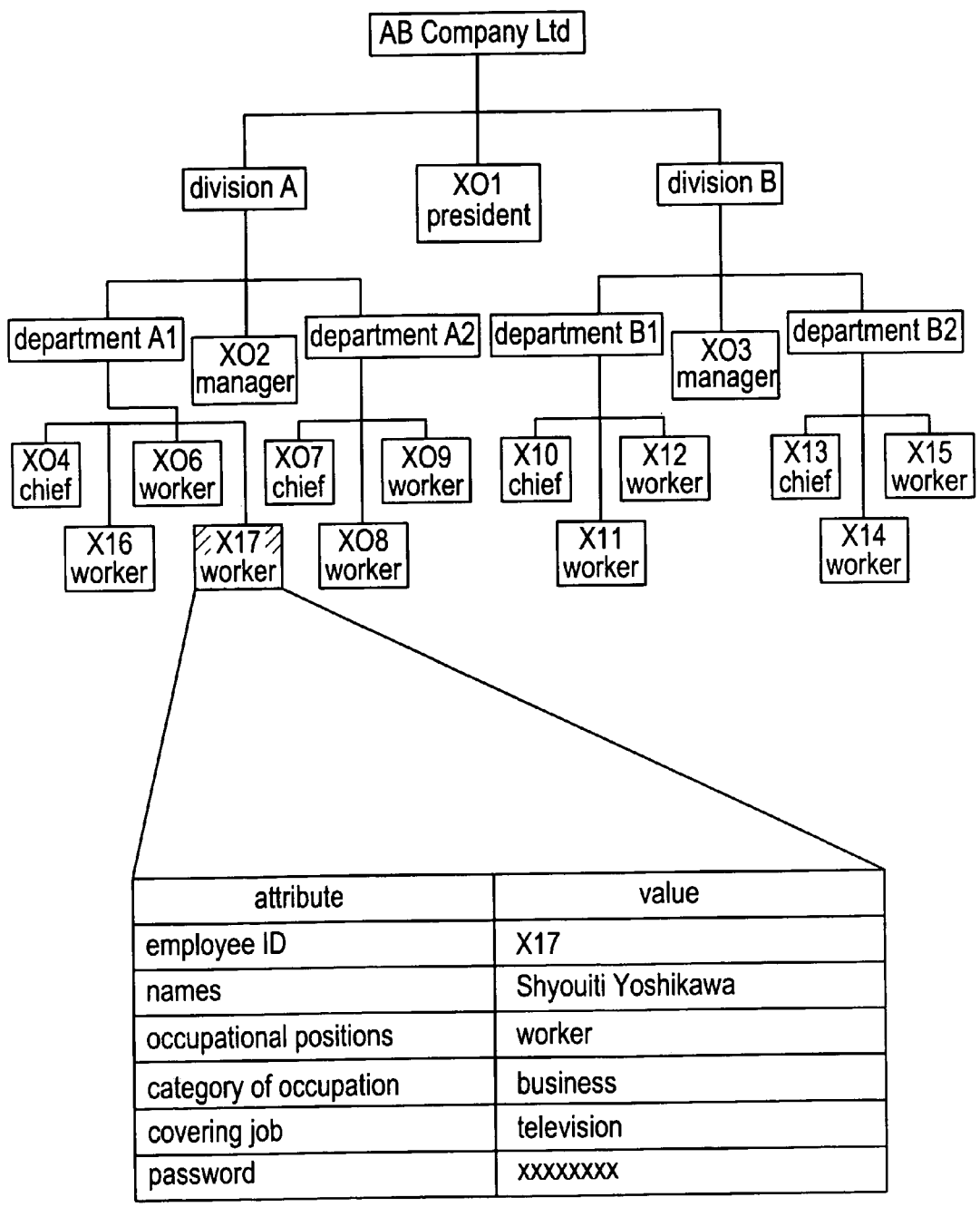
FIG. 20 is a tree diagram illustrating an example of information concerning the organization hierarchy and the distribution of personnel stored in the organization definition information storing unit 31 of FIG. 1 in a case where an employee whose employee ID is "X17" is newly assigned to the department A1 of the division A as a person in charge of "television"
Figure 22:
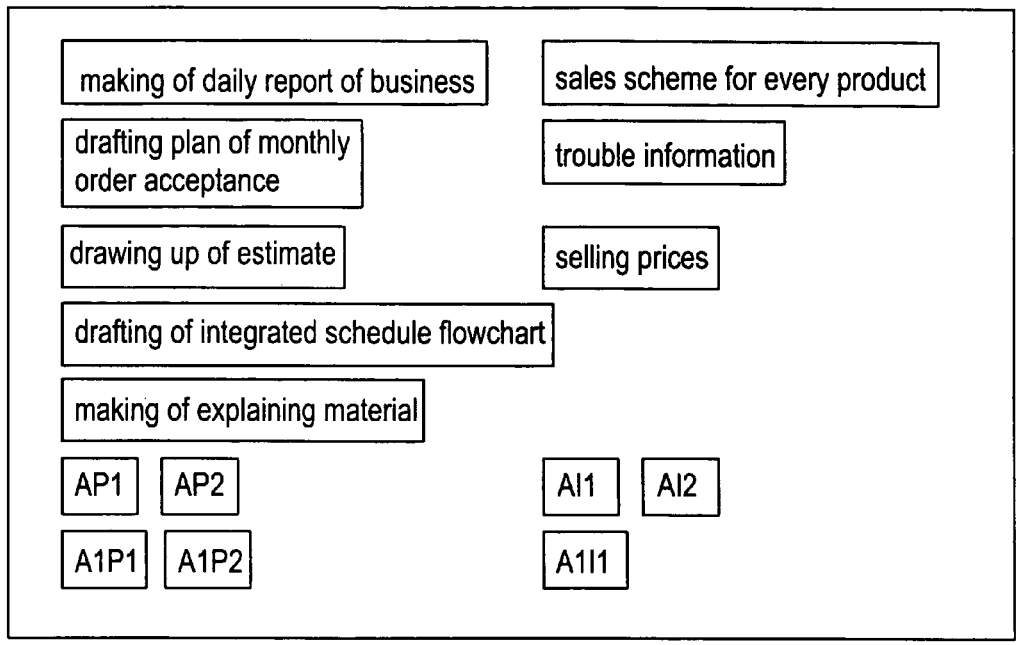
FIG. 22 is a diagrammatic view illustrating the organization definition information shown in FIG. 21, and an example for constructing the personal environment for the user whose employee ID is "X17" in a case where the customizing information indicated in the diagrams of FIGS. 14 and 15(A) and 15(B)

FIG. 20 illustrates an example in which an employee whose employee ID is "X17" is newly assigned to the department A1 of the division A to undertake the covering job of "television".

FIG. 21 illustrates the result of the personnel reshuffling including the assignment of "X17", reflected by organization definition information registering means 21, against the organization definition information indicated in FIG. 19 and stored in organization definition information storing unit 31. A hatched portion in FIG. 21 represents a part changed from the organization definition information of FIG. 19. It will be understood from FIG. 21 that the attribute value concerning the affiliation, the occupational position, and the category of occupation of "X17" is the same as that of "X16". A difference between "X16" and "X17" in the organization definition information of FIG. 21 resides in only information on products that they cover, except for the employee ID, the names, and passwords. As shown in FIG. 21, although "X16" covers a video, "X17" covers a television. Similarly to the afore-mentioned example, the customizing information of FIGS. 14 and 15(A) and 15(B) is stored in customizing information storing unit 32 to be unitarily managed, and can be reused by the whole of the organization. Therefore, after updating the organization definition information in organization definition information registering means 21, when the operation of the personal environment constructing means 33 is executed on the newly assigned "X17", the customizing information of FIGS. 14 and 15(A) and 15(B) can be reused. Although the customizing condition in table of FIG. 14 and the table of FIG. 15(A) is established with regard to "X17", since the covering job of "X17" is a television, the customizing condition indicated in the table of FIG. 15(B) cannot be established. As a result, "X17" is provided with the personal environment indicated in FIG. 22.

Figure 23:
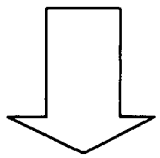
FIG. 23 is a diagrammatic view illustrating an example of a change in the contents information, which is made to the customizing condition of FIG. 5(1), stating that "being assigned to the division A", FIG. 23(1) corresponding to the contents information before change and FIG. 23(2) corresponding to those after change.
Figure 24:
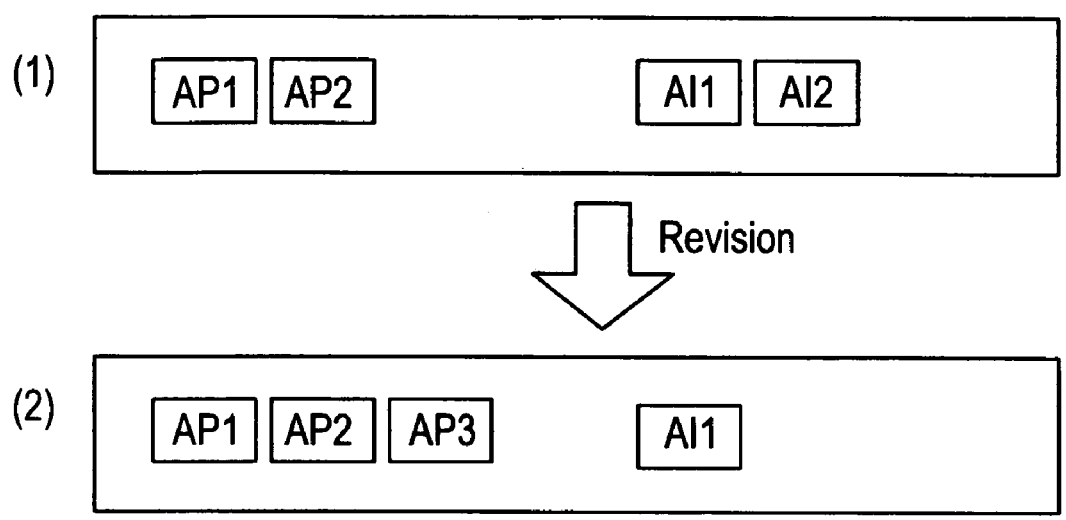
FIG. 24 is a diagrammatic view illustrating an example of the change in the utilization environment effective to seven persons assigned to the division A of FIG. 3 that is caused by the change in the customizing information shown in FIG. 23, FIG. 24(1) corresponding to the utilization environment before the change and FIG. 24(2) corresponding to that after the change.

FIG. 23 illustrates an example in which the contents information for the customizing condition stating, "being assigned to the division A" is revised. When looking into FIG. 3, the customizing condition stating, "being assigned to the division A" is established with regard to seven employees of "X02", "X04", "X05", "X06", "X07", "X08", and "X09". Accordingly, in the case where the customizing condition in table (1) of FIG. 23 is designated, the using environment shown in table (1) of FIG. 24 is provided as the using environment for the seven employees. At this stage, it is assumed that for all of the employees who are assigned to the division A, "AP 3" is needed to be added as the procedure, and "AI 2" is needed to be deleted as the information. These changes may be realized by revising the customizing information in table (1) of FIG. 23 to that in table (2) of FIG. 23. The customizing information in table (2) of FIG. 23 becomes automatically valid for the seven persons assigned to the division A, and thus only revision of the unitarily managed customizing information at one time will enable it to automatically revise the using environment of the corresponding seven persons to the using environment of table (2) of FIG. 23. The revision of the customizing information may be executed not only for revision of the contents information but also for revision of customizing condition. For example, if the customizing information of table (2) of FIG. 23 is revised to a condition stating, "being assigned to the department A1", the customizing condition after revision is established only for the employees "X04", "X05", and "X06", and therefore the using environment of table (2) of FIG. 24 will be supplied only to these three persons.

Features of the Invention

As described above, the present invention provides a business information system by which optimum utilization environment for the execution of jobs by individuals may be provided by customizing personal environment of individuals who utilize the business information system by the use of the organization hierarchy, the distribution of personnel, and the occupational positions as well as the covering duties of individuals that constitute the organization definition information, and systematic reuse of the customizing information may be made possible by enabling it to define the customizing information without being subordinate to individuals and to unitarily manage the customizing information. The principal constitutional elements of the business information system according to the present invention may be summarized below with reference to FIG. 1.

Organization definition information registering means 21 receives information including the organization hierarchy, the distribution of personnel, and the job definition of individuals that constitute the organization definition information, and authentication information indicating that an individual is a true user of the business information system from input device 1, and stores these information in organization definition information storing unit 31. All contents including the procedure and information provided for the users of the business information system are stored in contents storing unit 33. Customizing information registering means 22 receives authentication information of a user from input device 1, and after confirming that the user is a true user of the business information system, stores in set, as information for customizing the utilization environment of the business information system, customizing condition set by the use of arbitrary organization definition information stored in organization definition information storing unit 31 and contents information such as the procedure and information that are provided as utilization environment in a case where the customizing condition is established, in customizing information storing unit 32. Personal environment constructing means 23 receives authentication information of a user from input device 1, and after confirming that the user is a true user of the business information system, acquires the customizing information from customizing information storing unit 32 to inspect as to whether or not the customizing condition is established for the user by the use of the organization definition information stored in organization definition information storing unit 31. When the customizing condition is established, personal environment constructing means 23 acquires contents such as the procedure and information from contents storing unit 33 by the contents information stored in set together with the customizing condition, and adds such acquired contents to the personal environment of the user. When the customizing condition is not established, nothing is executed. Personal environment constructing means 23 executes inspecting as to whether or not the customizing condition is established for all of the customizing information stored in customizing information storing unit 32, and processing of addition of the contents to the personal environment in a case where the customizing condition is established, and thereafter displays the personal environment on the output device 4.

It should be understood that the embodiments of the present invention is not limited to the afore-described embodiments, and various modification, for example, unification or separation of respective constituting elements may be made appropriately. Also, the programs executed by the information processing apparatus, such as an electronic computer, which constitutes the present invention may be distributed via recording mediums capable of being read by the computer, and communication network.

While a preferred embodiment of the present invention has been described using specific terms, such description is for illustrative purposes only, and it is to be understood that changes and variations may be made without departing from the spirit or scope of the following claims.

What is claimed is:

1. A business information system comprising:
an organization definition information storing unit for storing organization definition information for defining an organization, each item of the organization definition information being stored as a triple-set of division information, item information, and content;
a contents storing unit for storing contents that include either a procedure or information provided for users or both of them;
a customizing information storing unit for storing in set, as customizing information, a customizing condition set as information customizing a utilization environment by use of arbitrary organization definition information stored in said organization definition information storing unit, a procedure corresponding to the customizing condition, and information for indicating contents to be provided as utilization environment in a case where the customizing condition is established;
an organization definition information registering means for storing input organization definition information in said organization definition information storing unit;
a customizing information registering means for storing in set, as customizing information, input customizing condition and information indicating contents to be provided in a case where the customizing condition is established, in said customizing information storing unit; and
a personal environment constructing means for acquiring the customizing information from said customizing information storing unit, for judging whether or not the customizing condition is established with regard to each user by utilizing the organization definition information stored in said organization definition information storing unit, and for acquiring the contents stored in set together with the customizing condition from said contents storing unit in a case where the customizing condition is established, thereby adding the acquired contents to a personal environment of the user,
wherein said organization definition information storing unit stores authentication information indicating that each of individuals is a true user of the business information system, and wherein at least one of said organization definition information registering means, said customizing information registering means and said personal environment constructing means executes a processing only when a user is a true user of the business information system, on a basis of the input authentication information of the user, and
wherein, when the user is determined to be a true user of the business information system, unevaluated customizing information is acquired from the customizing information storing unit by the personal environment constructing means, and an inspection is executed by the personal environment constructing means as to whether or not the customizing condition is established, and if the customizing condition is established, the unevaluated customizing information is added to a personal environment of the user by the personal environment constructing means.

2. The business information system according to claim 1, wherein said organization definition information comprises at least one of information representing organization hierarchy, information representing partial organization, information representing distribution of personnel, and information relative to a job of each of individuals.

3. The business information system according to claim 2, wherein said information relative to the job of each of the individuals comprises information representing at least one of an employee identification number, a name, an occupational position, a covering job, a function, a duty, a knowledge, an experience, and a location.

4. The business information system according to claim 2, wherein said organization definition information storing unit stores authentication information indicating that each of individuals is a true user of the business information system, and wherein at least one of said organization definition information registering means, said customizing information registering means and said personal environment constructing means executes a processing only when a user is a true user of the business information system, on a basis of the input authentication information of the user.

5. The business information system according to claim 3, wherein said organization definition information storing unit stores authentication information indicating that each of individuals is a true user of the business information system, and wherein at least one of said organization definition information registering means, said customizing information registering means and said personal environment constructing means executes a processing only when a user is a true user of the business information system, on a basis of the input authentication information of the user.

6. The business information system according to claim 1, wherein said customizing condition is capable of being defined by a complex condition, which is a combination of a plurality of conditions.

7. The business information system according to claim 2, wherein said customizing condition is capable of being defined by a complex condition, which is a combination of a plurality of conditions.

8. The business information system according to claim 3, wherein said customizing condition is capable of being defined by a complex condition, which is a combination of a plurality of conditions.

9. The business information system according to claim 1, wherein said customizing condition is capable of being defined by a complex condition, which is a combination of a plurality of conditions.

10. The business information system according to claim 4, wherein said customizing condition is capable of being defined by a complex condition, which is a combination of a plurality of conditions.

11. The business information system according to claim 5, wherein said customizing condition is capable of being defined by a complex condition, which is a combination of a plurality of conditions.

12. A method of managing business information by use of
an organization definition information storing unit for storing an organization definition for defining an organization,
a contents storing unit for storing contents that include either a procedure or information provided to users or both of them, and
a customizing information storing unit for storing in set, as customizing information, a customizing condition set as information customizing a utilization environment by using arbitrary organization definition information stored in said organization definition information storing unit, and information for indicating contents to be provided as utilization environment in a case where the customizing condition is established,
the method comprising:
an organization definition information registering step for storing input organization definition information in said organization definition information storing unit, each item of the organization definition information being stored as a triple-set of division information, item information, and content;
a customizing information registering step for storing in set, as the customizing information, input customizing condition, a procedure corresponding to the customizing condition, and information indicating contents to be provided in a case where the customizing condition is established, in said customizing information storing unit;
a personal environment constructing step for acquiring the customizing information from said customizing information storing unit, for judging whether or not the customizing condition is established with regard to each user by a utilization of the organization definition information stored in said organization definition information storing unit, and for acquiring the contents stored in set together with the customizing condition from said contents storing unit in a case where the customizing condition is established, thereby adding the acquired contents to a personal environment of the user;
storing, in said organization definition information storing unit, authentication information indicating that each of individuals is a true user of the business information system;
executing, by at least one of said organization definition information registering step, said customizing information registering step and said personal environment constructing step, a processing only when a user is a true user of the business information system, on a basis of the input authentication information of the user;
wherein, when the user is determined to be a true user of the business information system, the method comprises the steps of:
acquiring unevaluated customizing information from the customizing information storing unit;
performing an inspection as to whether or not the customizing condition is established; and
if the customizing condition is established, adding the unevaluated customizing information to a personal environment of the user.

13. The business information system according to claim 1, wherein the division information includes a first type of data corresponding to information pertinent to an entire company, and a second type of data corresponding to information pertinent to each respective individual of the entire company.

14. The method according to claim 12, wherein the division information includes a first type of data corresponding to information pertinent to an entire company, and a second type of data corresponding to information pertinent to each respective individual of the entire company.

* * * * *